US012588659B2

(12) United States Patent (10) Patent No.: US 12,588,659 B2
Salyer et al. (45) Date of Patent: Mar. 31, 2026

(54) MULTI-LAYERED PET TOY AND METHOD OF MAKING SAME

(71) Applicant: The Kyjen Company, LLC, Centennial, CO (US)

(72) Inventors: Danielle Salyer, Denver, CO (US); Meghan Higgins, Denver, CO (US); Lynn Rosen, Parker, CO (US)

(73) Assignee: The Kyjen Company, LLC, Centennial, CO (US)

( * ) Notice: Subject to any disclaimer, the term of this patent is extended or adjusted under 35 U.S.C. 154(b) by 0 days.

(21) Appl. No.: 19/054,263

(22) Filed: Feb. 14, 2025

(65) Prior Publication Data

US 2025/0287922 A1     Sep. 18, 2025

Related U.S. Application Data

(60) Provisional application No. 63/566,092, filed on Mar. 15, 2024.

(51) Int. Cl.
A01K 15/02 (2006.01)

(52) U.S. Cl.
CPC ................................. A01K 15/026 (2013.01)

(58) Field of Classification Search
CPC ...... A01K 15/025; A01K 15/026; A63H 3/28; A63H 3/02
See application file for complete search history.

(56) References Cited

U.S. PATENT DOCUMENTS

| | | | |
|---|---|---|---|
| 6,918,355 B1 * | 7/2005 | Arvanites ............ | A01K 15/026 |
| | | | 119/707 |
| 7,870,839 B2 * | 1/2011 | Sacra ................... | A01K 15/025 |
| | | | 119/709 |
| 7,950,352 B2 * | 5/2011 | Specht ................. | A01K 15/026 |
| | | | 446/184 |
| 9,295,233 B2 * | 3/2016 | Axelrod ............... | A01K 15/026 |
| 2002/0187718 A1 * | 12/2002 | Ritchey .................. | A63H 3/003 |
| | | | 446/71 |
| 2005/0075034 A1 * | 4/2005 | Ritchey ................ | A01K 15/025 |
| | | | 446/71 |
| 2005/0227572 A1 * | 10/2005 | Ritchey .................. | A63H 3/003 |
| | | | 446/71 |
| 2011/0117809 A1 * | 5/2011 | Bowar ................... | A63H 3/005 |
| | | | 446/369 |
| 2013/0213316 A1 * | 8/2013 | Zhang .................. | A01K 15/025 |
| | | | 119/707 |
| 2016/0227740 A1 | 8/2016 | Nunn | |
| 2017/0118957 A1 * | 5/2017 | Nunn ................... | A01K 15/025 |

OTHER PUBLICATIONS

Chewy "KONG Ballistic Boomerang Dog Toy, Color Varies". Obtained on Feb. 14, 2025. pp. 1-6. https://www.chewy.com/kong-ballistic-boomerang-dog-toy/dp/38613?utm_source=google-product &utm_medium=cpc&utm_content=KONG&utm_campaign= 19996370614&utm_term=&gclid= EAlalQobChMIqrL9g42cgQMVahWtBh3g0AyvEAQYASABEglw3fD_ BwE.

* cited by examiner

*Primary Examiner* — Trinh T Nguyen
(74) *Attorney, Agent, or Firm* — Lempia Summerfield Katz LLC

(57) ABSTRACT
A method of manufacturing a multi-layered pet toy includes assembling at least one panel by coupling a heat resistant lining to an outer layer and injection molding an inner layer to the heat resistant lining.

10 Claims, 9 Drawing Sheets

MULTI-LAYERED PET TOY AND METHOD OF MAKING SAME

This application claims the benefit of priority to U.S. Provisional Application entitled "MULTI-LAYER PET TOY AND METHOD OF MAKING THE SAME" filed Mar. 15, 2024, and assigned Ser. No. 63/566,092, the entire disclosure of which is hereby expressly incorporated by reference.

BACKGROUND OF THE DISCLOSURE

Field of the Disclosure

The disclosure relates generally to pet toys, and more specifically, to durable pet toys including multiple layers.

Brief Description of Related Technology

Generally, a wide variety of pet toys are available to keep pets entertained. For example, pet toys include chew toys comprised of durable material(s) and designed to withstand heavy chewing. Other pet toys include squeaky toys, designed to make noise entertaining pets; balls and frisbees, designed to entertain pets while encouraging exercise; plush toys; and the like. However, in addition to keeping pets entertained, pet toys must be durable in order to withstand chewing and the wear and tear of regular play. Generally, pet toys may be comprised of multiple materials to achieve a desired durability while maintaining a soft exterior. However, pet toys comprised of multiple materials are often difficult and costly to manufacture. Accordingly, there is a need for more durable pet toys and methods of manufacturing the same that improve manufacturability and reduce costs.

SUMMARY OF THE DISCLOSURE

In accordance with one aspect of the present disclosure, a multi-layered pet toy includes at least one panel including an outer layer, a durable lining coupled to the outer layer, and an inner layer injection molded on the durable lining.

In accordance with another aspect of the present disclosure, a method of manufacturing a multi-layered pet toy includes assembling a first panel and a second panel and coupling the first panel and the second panel. The first panel and the second panel assembled by coupling a durable lining to an outer layer, the outer layer configured to define an exterior surface of the pet toy and forming an inner layer directly on the durable lining.

In accordance with yet another aspect of the present disclosure, a method of manufacturing a multi-layered pet toy includes assembling at least one panel by coupling a heat resistant lining to an outer layer and injection molding an inner layer to the heat resistant lining.

In accordance with yet another aspect of the present disclosure, a method of manufacturing a multi-layered pet toy includes assembling a first panel and a second panel by coupling a durable lining to an outer layer, coupling an inner layer to the durable lining, and coupling a binding along an outer periphery of the outer layer, durable lining, and inner layer for each of the first panel and the second panel. The method further includes providing a noisemaker between the first panel and the second panel and coupling the first panel and the second panel.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
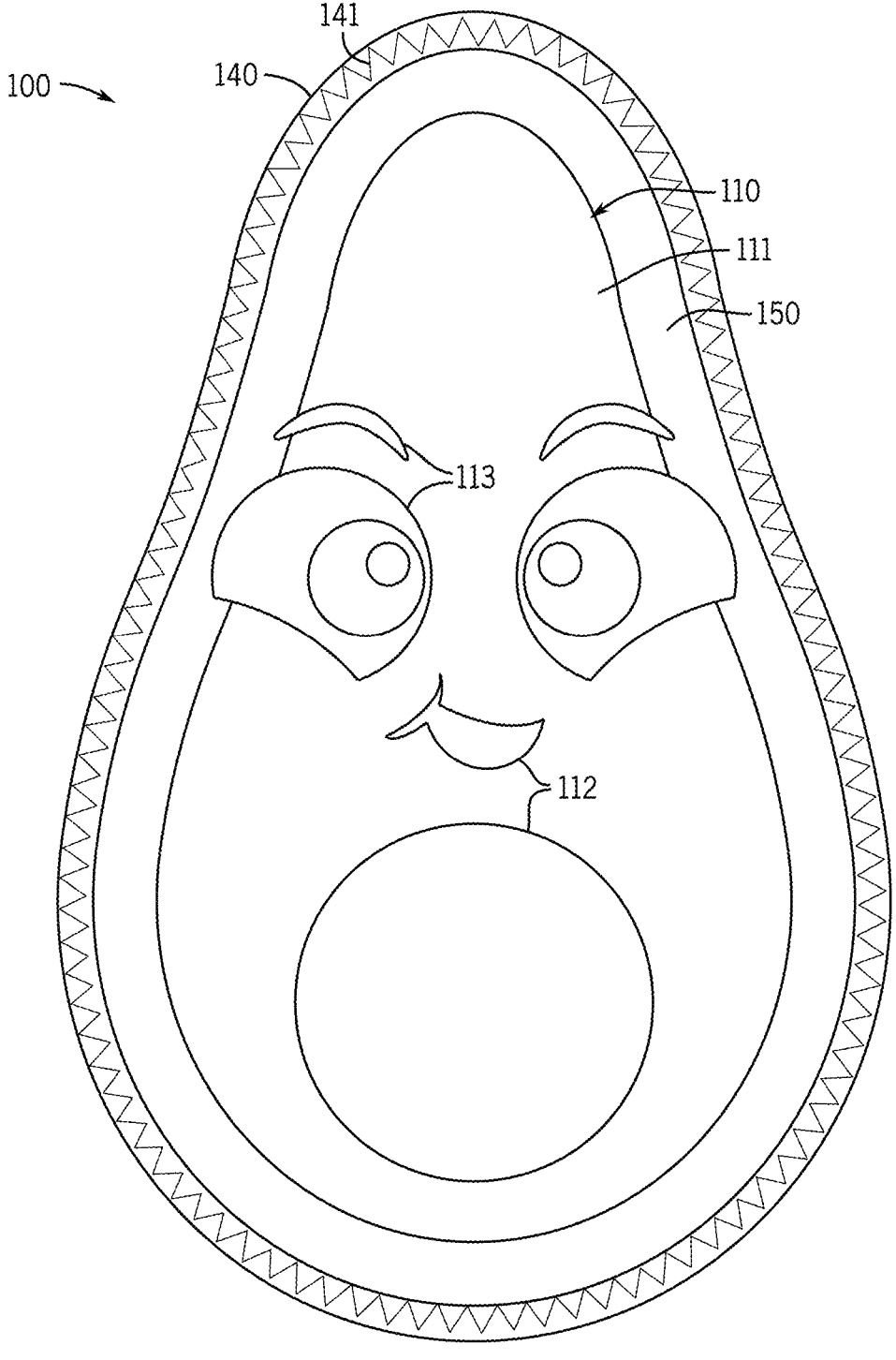
FIG. 1 illustrates a front view of multi-layered pet toy in accordance with one example of the present disclosure.

While the disclosed pet toys and methods are susceptible of embodiments in various forms, there are illustrated in the drawings (and will hereafter be described) specific embodiments of the disclosure, with the understanding that the disclosure is intended to be illustrative and is not intended to limit the disclosure to the specific embodiments described and illustrated herein.

DETAILED DESCRIPTION OF THE DISCLOSURE

The present disclosure is provided to solve the above-mentioned problems in the Background of the Disclosure section. Specifically, described herein are durable pet toys including multiple layers and methods of manufacturing the same. According to the present disclosure, a multi-layered (also referred to as multi-layer) pet toy may be comprised of two or more panels. Each panel may be comprised of two or more layers. According to some examples of the present disclosure, each of the multiple layers may be comprised of a different material. Further, according to the present disclosure, each layer may be designed and configured to perform a specific function and/or provide the pet toy with a specific characteristic or attribute. Specifically, a material that makes up each layer and/or a thickness of each layer may be selected in consideration of a desired functionality or attribute of the layer. Accordingly, a more durable pet toy may be achieved. Additionally, provided herein are methods of manufacturing a multi-layer pet toy.

As described herein, a multi-layer pet toy may include a noisemaker disposed between two or more panels coupled to one another. The plurality of layers which constitute a panel may be configured to protect the noisemaker disposed between the two or more panels. The plurality of layers constituting a panel may be coupled to one another. According to one example of the present disclosure, a panel may include an outer layer, a durable lining, and an inner layer. In some examples, each panel may include a binding coupled to and disposed around a periphery of the outer layer, the durable lining, and the inner layer. According to various examples of the present disclosure, the noisemaker may include a squeaker, a bell, crinkle paper, a rattle, a clicker, and the like.

As noted above, each layer of the panel may be comprised of a different material and may provide the multi-layer pet toy with a desirable characteristic or attribute. For example, the outer layer may be comprised of a soft material configured to be gentle on a pet's mouth (e.g., gums) during play and/or chewing. Additionally, the outer layer may include bright colors, distinct textures, and/or contrasting colors configured to attract or capture the attention of a pet. Further, the durable lining may be comprised of a strong material configured to prevent a pet's teeth from penetrating therethrough during playing and/or chewing. Additionally, in some examples, the durable lining may be comprised of a heat resistant material allowing one or more layers of the pet toy to be injection molded to the durable lining. Further, the inner layer may be a flexible, durable material configured to withstand heavy chewing. The inner layer may also be configured to protect a noisemaker, or another device disposed within the pet toy.

According to the present disclosure, each of the outer layer, the durable lining, and the inner layer may be coupled to one another. For example, adjacent layers (e.g., outer layer, durable lining, inner layer) may be directly coupled to one another. Additionally, each panel may include a binding coupled to a periphery of the outer layer, durable lining, and inner layer. Specifically, in some examples, the binding may be directly coupled to each of the outer layer, the durable lining, and the inner layer. In some examples, the binding may be sewn to the outer layer, the durable lining, and the inner layer.

In some examples, the inner layer may be formed on the durable lining. For example, the inner layer may be injection molded to the durable lining. Accordingly, the strength of a connection between the inner layer and the durable lining may be improved. Further, injection molding the inner layer directly to the durable lining may simplify manufacturing, obviating the need to couple a separately formed inner layer to the durable lining. Thereby, the pet toy may be easier to manufacture and the cost of manufacturing the pet toy may be reduced.

Figure 2:
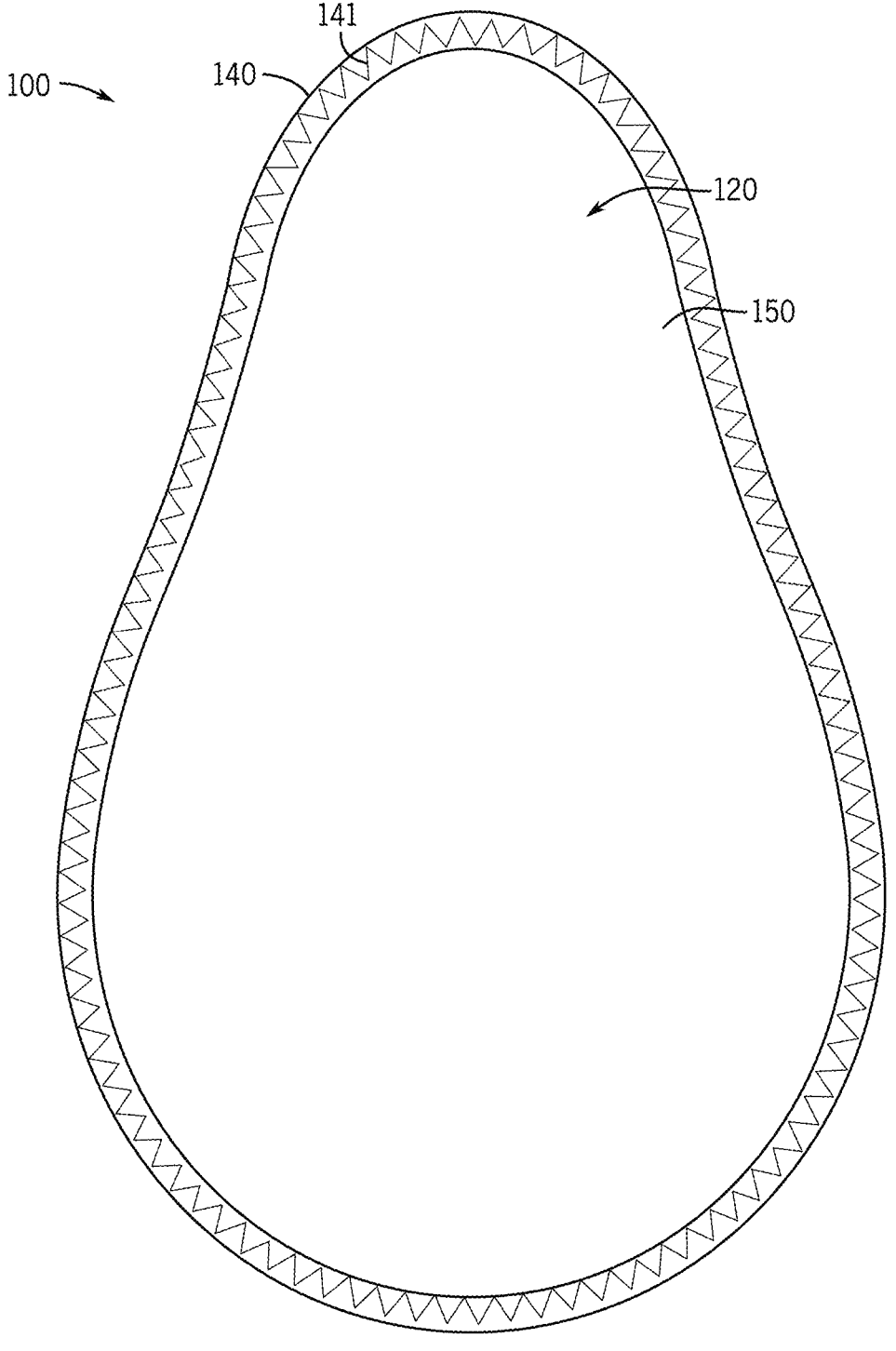
FIG. 2 illustrates a back view of a multi-layered pet toy in accordance with one example of the present disclosure.
Figure 3:
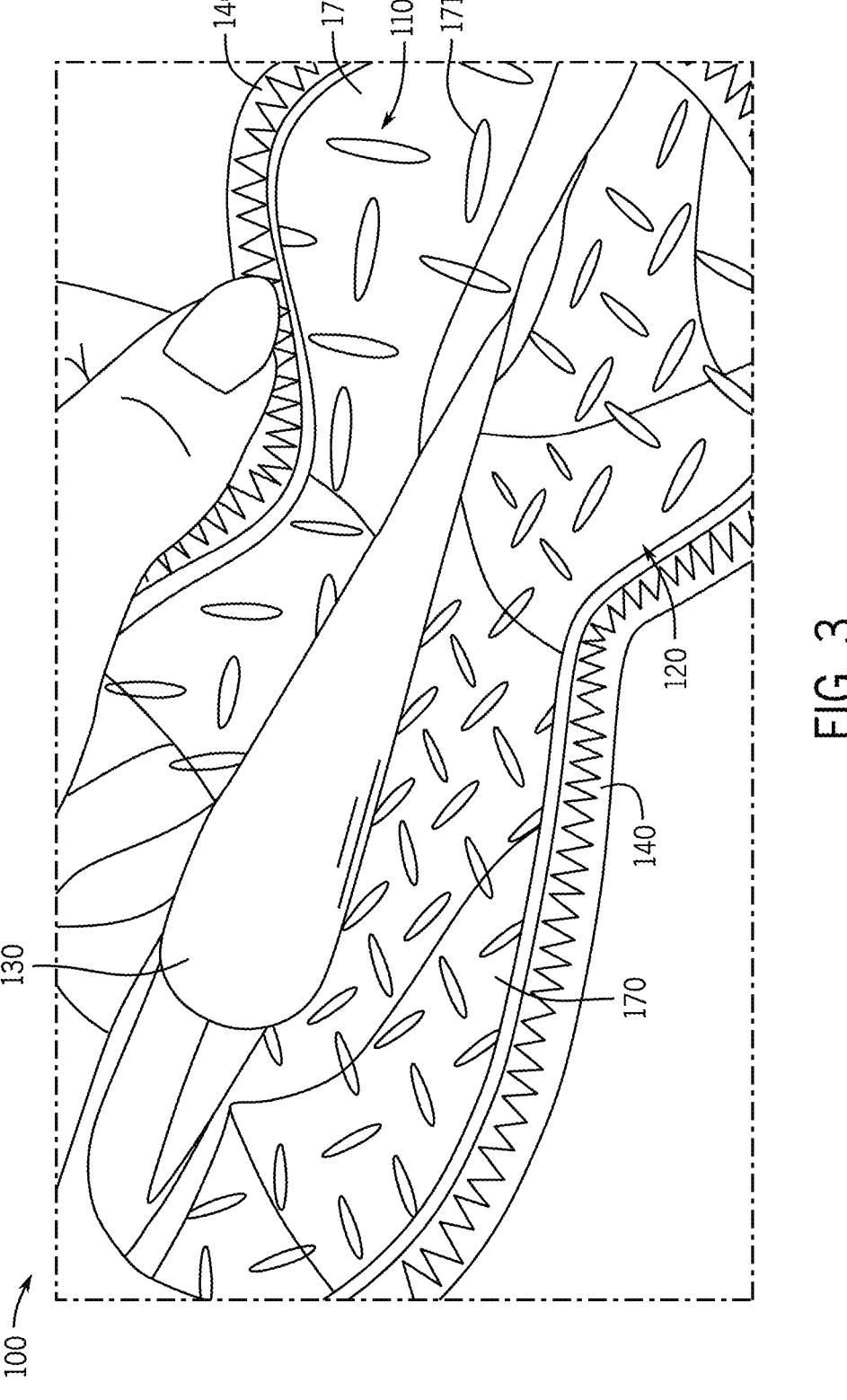
FIG. 3 illustrates a multi-layered pet toy in a partially assembled state in accordance with one example of the present disclosure.

Referring generally to FIGS. 1-3, a multi-layer pet toy in accordance with one example of the present disclosure is illustrated. As shown in FIGS. 1-3, the multi-layer pet toy 100 includes a first panel 110, a second panel 120, and a noisemaker 130. In some examples, as illustrated in FIGS. 1-3, the multi-layer pet toy 100 may be comprised of two panels; however, the present disclosure is not limited thereto and the multi-layer pet toy 100 may be comprised of any number of two or more panels. For example, a multi-layer pet toy according to another example of the present disclosure may include three panels; for example, the multi-layer pet toy may have a cylindrical shape comprised of two circular panels and a rectangular panel coupled to one another. In another example, a multi-layer pet toy may have four panels coupled to one another to form a tetrahedron or triangular pyramid shape. In yet another example, a multi-layer pet toy may have six panels coupled to one another to form a cuboid shape.

According to the present disclosure, a noisemaker 130 may be disposed between the two or more panels 110, 120 included in the multi-layer pet toy. Specifically, with respect to the example of FIGS. 1-3, the noisemaker 130 may be disposed between the first panel 110 and the second panel 120. As noted above, the panels (e.g., first panel 110, second panel 120) may protect the noisemaker 130. In some examples, the noisemaker 130 may be placed between the panels 110, 120 and the panels 110, 120 may subsequently be coupled to one another such that the noisemaker 130 is sealed or maintained between the panels 110, 120. For example, a periphery of the two or more panels 110, 120 may be coupled to one another such that the noisemaker 130 is disposed in a pocket between the two or more panels 110, 120.

Still referring generally to FIGS. 1-3, the pet toy 100 may be shaped to represent an object or an animal. Specifically, the pet toy 100 may have a shape corresponding to a silhouette of the object or animal represented. In some examples, the pet toy 100 may be shaped like a fruit, vegetable, or fungi. Specifically, the pet toy 100 may have the shape of an avocado, a cob of corn, a mushroom, or a slice of watermelon. In other examples, the pet toy 100 may have the shape of an animal. The pet toy 100 may have the shape of any item, object, or living thing. In some examples, the pet toy 100 may further include one or more designs or images printed and/or embroidered on a surface (e.g., front and/or back) of the pet toy.

Referring to FIG. 1, a front view of the pet toy 100 including the front or first panel 110 is illustrated in accordance with one example of the present disclosure. In one example, as illustrated in FIG. 1, the first panel 110 may have the shape of an avocado; however, as noted above, the present disclosure is not limited thereto. Specifically, the first panel 110 may have the shape of any object or animal. As noted above and described hereinafter, the first panel 110 may be comprised of a plurality of layers. An outer layer 150 of the first panel 110 may form an exterior surface of the pet toy 100. In some examples, the outer layer 150 may be brightly colored in order to attract or capture the attention of a pet.

In some examples, as illustrated in FIG. 1, the first panel 110 may further include a decorative patch or decorative layer 111. The decorative layer 111 may be coupled to the outer layer 150 of the first panel 110. Specifically, in some examples, the decorative layer 111 may be placed on top of the outer layer 150. The decorative layer 111 may be sewn, glued, or otherwise coupled to the outer layer 150. The decorative layer 111 may be comprised of a different material, have a different color, and/or have a different texture than the outer layer 150. Specifically, in some examples, the outer layer 150 and the decorative layer 111 may have different textures, so as to attract a pet. Specifically, in some examples, a textile or fabric of which the outer layer 150 is made and a textile or fabric of which the decorative layer 111 is made may include pile or strands having different lengths. In other examples, the outer layer 150 and the decorative layer 111 may have contrasting colors, so as to attract a pet. In some examples, the first panel 110 may include two or more decorative layers 111.

As illustrated in FIG. 1, in some examples, the first panel 110 may further include one or more designs or images configured to attract a pet to the pet toy 100. Specifically, as illustrated in FIG. 1, the first panel 110 may include one or more printed designs 112 and/or one or more embroidered designs 113. The printed designs 112 may be printed directly on the outer layer 150 of the first panel 110 and/or the decorative layer 111. The embroidered designs 113 may be embroidered (e.g., sewn) in the outer layer 150 of the first panel 110 and/or the decorative layer 111. In some examples, one or more patches or swaths of fabric or textile may be sewn to the outer layer 150 and/or the decorative layer 111.

The printed designs 112 and/or embroidered designs 113 may be any shape or design. In some examples, as illustrated in FIG. 1, the printed designs 112 and/or embroidered designs 113 may be facial features. For example, the printed designs 112 and/or embroidered designs 113 may be of eyebrows, eyes, a nose, a mouth, or the like. In other examples, the printed designs 112 and/or embroidered designs 113 may be a feature or features of an object or animal to which the shape of the pet toy 100 corresponds (e.g., an avocado seed/pit). The printed designs 112 and/or embroidered designs 113 may be any size.

Referring to FIG. 2, a back view of the pet toy 100 is illustrated in accordance with one example of the present disclosure. In some examples, as illustrated in FIGS. 1 and 2, the first panel 110 and the second panel 120 may have a corresponding (e.g., the same) shape. Specifically, as illustrated in FIG. 2, the second panel 120 may have an avocado shape; however, the present disclosure is not limited thereto and the second panel 120 may have the shape of any object or animal. As noted above, the second panel 120 may be comprised of a plurality of layers. In some examples, as will be described hereinafter, the first panel 110 and the second panel 120 may include the same layers. As shown in FIG. 2, an outer layer 150 of the second panel 120 may form an exterior surface of the pet toy 100.

In some examples, the second panel 120 may include a decorative layer 111. As described above with respect to the first panel 110, the decorative layer 111 may be coupled to the outer layer 150 of the second panel 120. Similarly, the decorative layer 111 may be placed on the outer layer 150 and sewn or glued to the outer layer 150 of the second panel 120. In some examples, the second panel 120 may include two or more decorative layers 111.

In some examples, the second panel 120 may further include one or more printed designs 112 and/or one or more embroidered designs 113. The printed designs 112 may be printed directly on the outer layer 150 of the second panel 120 and/or the decorative layer 111. The embroidered designs 113 may be embroidered (e.g., sewn) in the outer layer 150 of the second panel 120 and/or the decorative layer 111. In some examples, one or more patches or swaths of fabric or textile may be sewn to the outer layer 150 and/or the decorative layer 111.

In accordance with some examples of the present disclosure, the pet toy 100 may further include one or more appendages, for example, one or more arms, legs, wings or the like. In some examples the one or more appendages may be disposed between or on (i.e., sewn between or to) the first 110 panel and the second panel 120 of the pet toy 100. According to other examples, the one or more appendages may be sewn to an exterior surface and/or a binding of one of the first panel 110 or the second panel 120.

Referring to FIG. 3, a pet toy 100 is illustrated in a partially assembled state in accordance with one example of the present disclosure. As illustrated in FIG. 3, the first panel 110 and the second panel 120 are only partially coupled to one another, such that the noisemaker 130 is visible. As shown in FIG. 3, the noisemaker 130 may be disposed between the first panel 110 and the second panel 120. In some examples, the noisemaker 130 may be provided between the first and second panels 110, 120 and the first and second panels 110, 120 may subsequently be coupled to one another, such that the noisemaker 130 is retained between the first and second panels 110, 120. As described in greater detail below, a periphery of the first panel 110 and a periphery of the second panel may be coupled (e.g., sewn) together. As illustrated in FIG. 3, the first panel 110 and the second panel 120 are only coupled along a portion of the periphery of the first and second panels 120, respectively.

Figure 6:
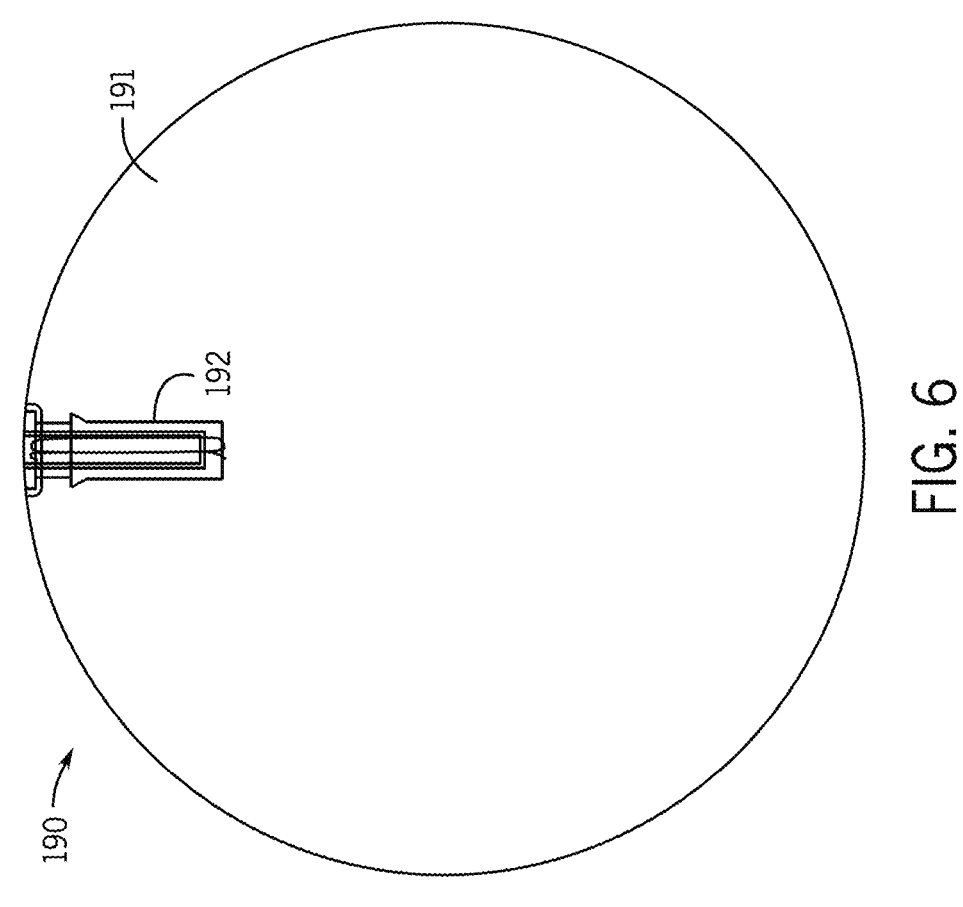
FIG. 6 illustrates a squeaker in accordance with another example of the present disclosure.
Figure 5:
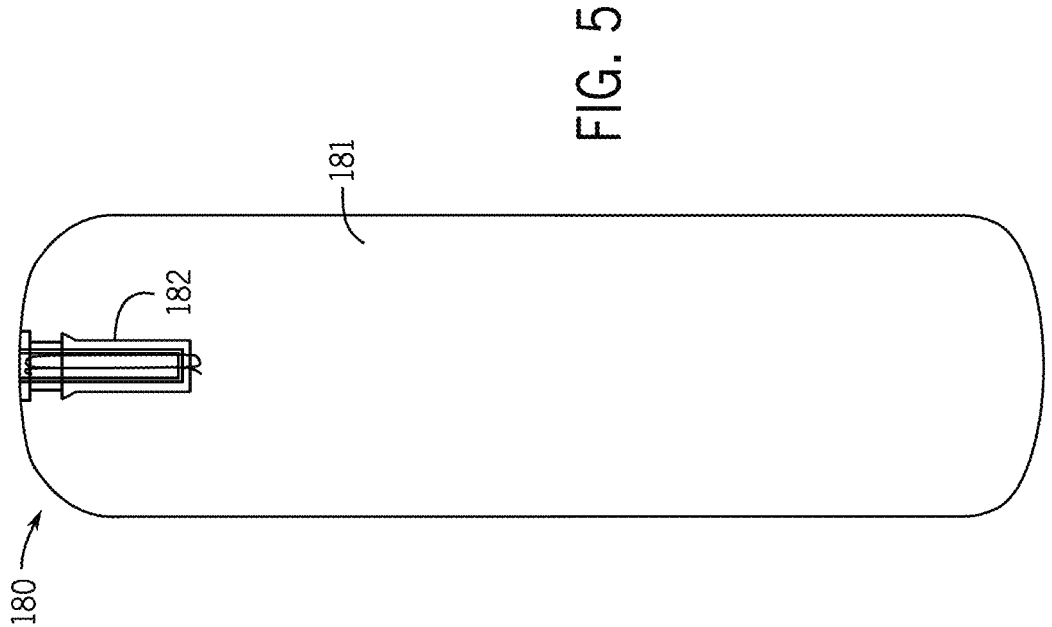
FIG. 5 illustrates a squeaker in accordance with one example of the present disclosure.

The noisemaker 130 may be configured to produce or generate a noise when the pet toy 100 is interacted with. Specifically, the noisemaker 130 may be configured to generate a noise when the pet toy 100 is compressed, moved, deformed, or the like. Specifically, the noisemaker 130 may be configured to generate a noise when a pet plays or interacts with the pet toy 100. In some examples, as illustrated in FIG. 3, the noisemaker 130 may be a squeaker. However, the present disclosure is not limited thereto and in other examples, the noisemaker 130 may be a bell, crinkle paper, a rattle, a clicker, an electronic noise producing device, or the like, and any combination thereof. FIGS. 5 and 6 described hereinafter provide squeakers in accordance with examples of the present disclosure.

Figure 4:
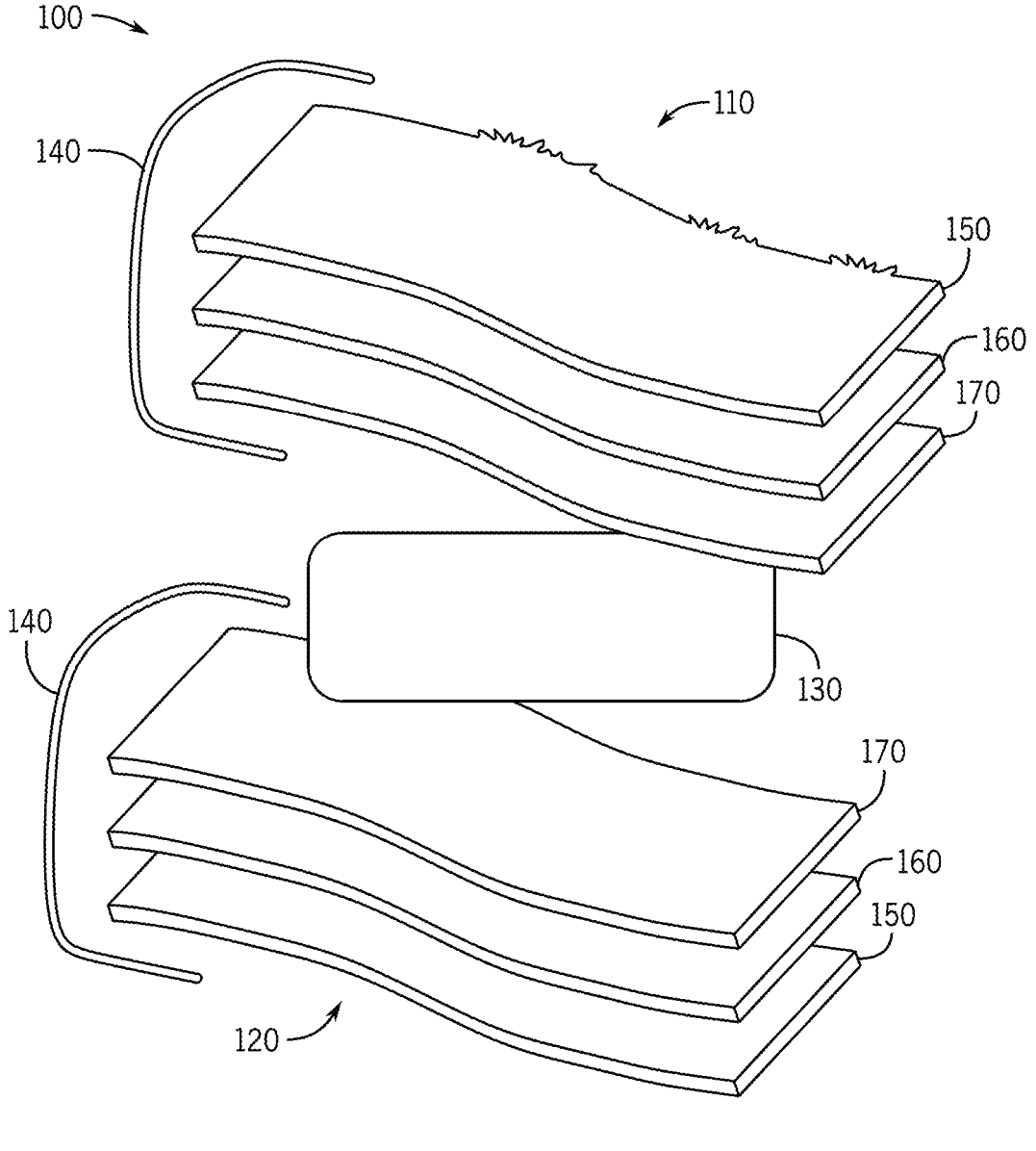
FIG. 4 illustrates a diagram of a multi-layered pet toy in accordance with one example of the present disclosure.

Referring to FIG. 4, a diagram of a pet toy 100 in accordance with one example of the present disclosure is illustrated. Specifically, the diagram of FIG. 4 illustrates the multiple layers and binding 140 of the first panel 110 and the second panel 120. In some examples, as illustrated in FIG. 4, the first panel 110 and the second panel 120 may include the same layers. Specifically, the first panel 110 and the second panel 120 may each include an outer layer 150, a durable lining 160, and an inner layer 170. Further, the first panel 110 and second panel 120 may each include a binding 140 coupled to and disposed around a periphery of the outer layer 150, the durable lining 160, and the inner layer 170.

According to some examples of the present disclosure, each of the outer layer 150, the durable lining 160, and the inner layer 170 may have the same shape. Specifically, the shape of each of the outer layer 150, the durable lining 160, and the inner layer 170 may correspond to the shape of the pet toy 100. Accordingly, each of the outer layer 150, the durable lining 160, and the inner layer 170 may have a shape corresponding to (e.g., the silhouette of) an object or animal represented by the pet toy 100. For example, each of the first panel 110 and the second panel 120 of the avocado shaped pet toy 100 illustrated in FIGS. 1 and 2 may include an avocado shaped outer layer 150, durable lining 160, and inner lining 170. In some examples, the first panel 110 and the second panel 120 may have the same shape.

Returning to FIG. 4, the layers of a panel (e.g., first panel 110, second panel 120) are described below. As noted above, the first panel 110 and the second panel 120 may be the same or a substantially similar. Accordingly, for ease of explanation, a single "panel" is described below; however, it should be understood that the term "panel" as used herein may refer to both the first panel 110 and/or the second panel 120.

The outer layer 150 may comprise or define an exterior surface of the panel (e.g., first panel 110, second panel 120). Further, the first panel 110 and the second panel 120 may be coupled to one another such that the outer layers 150 of the first panel 110 and the second panel 120 comprise or define an exterior surface of the multi-layer pet toy 100. In some examples, the outer layer 150 may be comprised of two or more pieces or sections of fabric or textile, which may be joined (e.g., sewn together) to form the outer layer 150. For example, two or more plush textiles having different length pile may be joined to form the outer layer 150. In some examples, a decorative layer 111 may be coupled to the outer layer 150 of the first panel 110 and/or the second panel 120, respectively. Accordingly, in some examples, the decorative layer 111 may form a portion of the exterior of the first panel 110, second panel 120, and/or multi-layer pet toy 100, respectively.

In accordance with some examples of the present disclosure, the outer layer 150 may be comprised of a soft material. Specifically, the outer layer 150 may be comprised of a soft material, such that, a pet's mouth (e.g., gums, tongue) are not injured or irritated during play with and/or chewing of the multi-layer pet toy 100. Accordingly, the outer layer 150 may be comprised of a relatively soft textile or fabric and may be configured to be gentle on a pet's mouth during play and/or chewing.

In some examples, the outer layer 150 may be comprised of a synthetic fiber textile or fabric. For example, the outer layer 150 may be comprised of one or more of polyester, polypropylene (PP), nylon, acrylic, rayon, and polyethylene fibers. In other examples, the outer layer 150 may be comprised of a natural fiber textile, for example, the outer layer 150 may be comprised of one or more of wool, cotton, denim, linen, and the like. In yet other examples, the outer layer 150 may be comprised of a blend of synthetic and natural fibers. The outer layer 150 may be a woven, knit, or unwoven textile of fabric. A thickness of the outer layer 150 may vary.

In some examples, the outer layer 150 may be comprised of a plush textile having pile (e.g., a plurality of strands or loops) extending from a base textile. A length of the strands or loops extending from the base textile may vary. In some examples, the outer layer 150 may be comprised of a polyester plush textile or fabric; however, the present disclosure is not limited thereto and the outer layer 150 may be a plush textile comprised of other synthetic fibers, natural fibers, or a blend thereof.

As described above, in some examples, a decorative layer 111 may be coupled to the outer layer 150. In some examples, both the outer layer 150 and the decorative layer 111 may be comprised of a plush textile. For example, both the outer layer 150 and the decorative layer 111 may be comprised of a polyester plush textile. In some examples, the outer layer 150 and the decorative layer 111 may include pile having different lengths. For example, the decorative layer 111 may be made of a plush textile having shorter pile (e.g., strands, loops) than the pile of a plush textile which the outer layer 150 is made of or vice versa. In some examples, a texture of the outer layer 150 may contrast with a texture of the decorative layer 111, so as to attract or capture the interest of a pet.

In some examples, the outer layer 150 may be comprised of a textile having a bright color so as to attract or interest a pet. Further, as noted above, a decorative layer 111 may be coupled to the outer layer 150 and/or one or more printed designs 112 and/or embroidered designs 113 may be included on the outer layer 150. As noted above, the first panel 110 and/or the second panel 120 may include a decorative layer 111, printed designs 112, and/or embroidered designs 113. In some examples, a color of the outer layer 150 may contrast with a color of any of the decorative layer 111, printed designs 112, and embroidered designs, so as to attract or capture the interest of a pet.

The durable lining 160 may be comprised of a durable material configured to withstand heavy chewing and rough play. According to some examples of the present disclosure, the durable lining 160 may be comprised of a puncture resistant material configured to prevent a pet's teeth from penetrating therethrough. Specifically, in some examples, the durable lining 160 may be configured to protect a noisemaker 130 disposed within the multi-layer pet toy 100 between the first panel 110 and the second panel 120. According to some examples of the present disclosure, as will be described hereinafter in more detail, the noisemaker 130 may be a squeaker including a bladder and a whistle (See FIGS. 5 and 6). In these examples, if the bladder of the squeaker is punctured (e.g., by a pet's teeth) the squeaker may be broken and may no longer generate a noise. Accordingly, in some examples, the durable lining 160 may advantageously prevent a noisemaker 130, such as a squeaker, from being punctured or broken during play and/or chewing.

In some examples, the durable lining 160 may be comprised of a heat resistant material. Specifically, in some examples, the durable lining 160 may advantageously be comprised of a heat resistant material such that an inner layer 170 may be formed directly on the durable lining 160. For example, as described hereinafter in greater detail, a durable lining 160 comprised of a heat resistant material may allow the inner layer 170 to be directly formed on the durable lining 160 using a plastic molding process requiring an elevated temperature. Specifically, in some examples, the durable lining 160 may be comprised of a heat resistant material such that the inner layer 170 may be injection molded directly onto the durable lining 160.

In accordance with another aspect of the present disclosure, the durable lining 160 may advantageously be comprised of a heat resistant material facilitating or allowing one or more layers to be coupled to the durable lining 160 using a thermal joining or thermal bonding process. For example, the durable lining 160 may be comprised of a heat resistant material such that one or more layers adjacent to the durable lining 160 may be coupled to the durable lining using various plastic welding processes, such as, hot plate welding, ultrasonic welding, friction welding, infrared welding, hot gas welding, extrusion welding, laser welding, and the like. Additionally, in some examples, the durable lining 160 may be comprised of a heat resistant material such that one or more adjacent layers may be coupled to the durable lining 160 using an adhesive bonding process requiring an elevated temperature.

As shown in FIG. 4, the durable lining 160 may be disposed between the outer layer 150 and the inner layer 170. The durable lining 160 may be coupled to the outer layer 150; specifically, the durable lining 160 may be directly coupled to the outer layer 150.

According to some examples of the present disclosure, a glue or adhesive may be used to couple to the durable lining 160 to the outer layer 150. Specifically, the durable lining 160 may be glued to the outer layer 150. In some examples, a glue or adhesive that sets at an ambient temperature may be used to couple the durable lining 160 to the outer layer 150. In other examples, an adhesive or glue requiring an elevated temperature to set may be used to couple the durable lining 160 to the outer layer 150.

According to some examples of the present disclosure, the durable lining 160 may be sewn to the outer layer 150. Specifically, a plurality of stitches may be used to couple the durable lining 160 to the outer layer 150. For example, a plurality of stitches extending through the durable lining 160 and the outer layer 150 along a periphery of and/or within an interior portion of the durable lining 160 and the outer layer 150, respectively, may be used to couple the durable lining 160 to the outer layer 150. In some examples, both a glue or adhesive and a plurality of stitched may be used to couple the durable lining 160 to the outer layer 150.

According to some examples of the present disclosure, the durable lining 160 may be comprised of a synthetic fiber textile. For example, the durable lining 160 may be comprised of one or more of polypropylene (PP), nylon, polyester, acrylic, rayon, and polyethylene fibers. In other examples, the durable lining 160 may be comprised of a natural fiber textile, for example, the durable lining 160 may be comprised of one or more of wool, cotton, denim, linen, and the like. In yet other examples, the durable lining 160 may be comprised of a blend of synthetic and natural fibers. The durable lining 160 may be comprised of woven, knit, or unwoven textile.

The weight and thickness of a fiber woven to create the durable lining 160 may directly affect the strength (e.g., durability) and heat resistance of the durable lining 160. The linear mass density of a fiber may be measured in Denier (D), as the mass in grams per 9,000 meters of the fiber. Generally, a textile comprised of a heavier and thicker fiber, having a higher Denier, may be stronger and/or more heat resistant than a textile comprised of a lighter and thinner fiber, having a lower Denier, but comprised of the same material. In accordance with some examples of the present disclosure, the durable lining 160 may be a woven textile comprised of a fiber having a mass of at least 400 Denier (D). In accordance with some examples of the present disclosure, the durable lining 160 may be a woven textile comprised of a fiber having a mass of at least 500 Denier (D). In accordance with another example of the present disclosure, the durable lining 160 may be comprised of a woven textile comprised of a fiber having a mass of 600 Denier. Specifically, in some examples, the durable lining 160 may be a woven textile comprised of a 600 D polypropylene or a 600 D nylon fiber.

Still referring to FIG. 4, the inner layer 170 may be comprised of a durable material configured to withstand heavy chewing and rough play. In some examples, the inner layer 170 may be comprised of a flexible material. Specifically, the inner layer 170 may be configured to deform elastically when chewed on or played with by a pet and return to its original shape after chewing and/or playing. The inner layer 170 may also be configured to protect a noisemaker 130 disposed within the multi-layer pet toy 100. In some examples, the inner layer 170 may be thicker than the outer layer 150 and/or the durable lining 160. In some examples, the inner layer 170 may be thicker than both the outer layer 150 and the durable lining combined.

In some examples, the inner layer 170 may be comprised of a rubber or a rubber like resin. For example, the inner layer 170 may be comprised of a thermoplastic elastomer (TPE) such as thermoplastic vulcanizate (TPV), styrenic block copolymers (TPE-S), thermoplastic polyolefins (TPE-O), thermoplastic polyurethanes (TPE-U), thermoplastic copolyesters (TPE-E), melt processable rubber (MPR), thermoplastic polyether block amides (TPE-A), ethylene vinyl acetate (EVA), or a combination thereof. Specifically, in some examples, the inner layer 170 may be comprised of a thermoplastic rubber (TPR).

As shown in FIG. 4, the inner layer 170 may be disposed adjacent (e.g., directly adjacent) to the durable lining 160. In some examples, as noted above and described hereinafter in greater detail, the inner layer 170 may be directly formed on the durable lining 160. For example, the inner layer 170 may be directly molded to the durable lining 160 using a plastic molding process. According to the present disclosure, the inner layer 170 may be injection molded, compression molded, or gravity cast directly onto the durable lining 160.

In other examples, the inner layer 170 may be formed separately or independently from the durable lining 160. For example, the inner layer 170 may be formed absent the durable lining 160 and prior to being coupled to the durable lining 160 and may subsequently be coupled to the durable lining 160. Specifically, the inner layer 170 may be directly coupled to the durable lining 160.

According to some examples of the present disclosure, a glue or adhesive may be used to couple to the inner layer 170 to the durable lining 160. Specifically, the inner layer 170 may be glued to the durable lining 160. In some examples, a glue or adhesive that sets at an ambient temperature may be used to couple the inner layer 170 to the durable lining 160. In other examples, an adhesive or glue requiring an elevated temperature to set may be used to couple the inner layer 170 to the durable lining 160.

According to some examples of the present disclosure, the inner layer 170 may be sewn to the durable lining 160. Specifically, a plurality of stitches may be used to couple the inner layer 170 to the durable lining 160. For example, a plurality of stitches extending through the inner layer 170 and the durable lining 160 along a periphery of and/or within an interior portion of the inner layer 170 and the durable lining 160, respectively, may be used to couple the inner layer 170 to the durable lining 160.

According to some examples of the present disclosure, the inner layer 170 may be coupled to the durable lining 160 using one or more plastic welding processes. For example, the inner layer 170 may be coupled to the durable lining 160 using one or more of hot plate welding, ultrasonic welding, friction welding, hot gas welding, extrusion welding, laser welding, and the like. According to some examples of the present disclosure, the inner layer 170 may be coupled to the durable lining 160 using any combination of an adhesive, sewing, or plastic welding.

The inner layer 170 may be disposed between the durable lining 160 and the noisemaker 130. Specifically, the inner layer 170 may be disposed directly adjacent to the durable lining 160 and/or the noisemaker 130. Referring to FIG. 3, in some examples, the inner layer 170 may include one or more protrusions 171 extending away from the inner layer 170 internally (i.e., toward the noisemaker 130). As noted above, the inner layer 170 may be disposed directly adjacent to the noisemaker 130. The one or more protrusions 171 of the inner layer 170 may be configured to contact or abut the noisemaker 130 and may prevent the noisemaker 130 from sliding or moving relative to the inner layer 170 and the panel (e.g., first panel 110, second panel 120) of the pet toy 100. Accordingly, a position of the noisemaker 130 (e.g., squeaker, clicker, rattle) disposed between the first panel 110 and the second panel 120 may be maintained such that a pet may more easily find and manipulate (e.g., compress, move) the noisemaker 130 causing the noisemaker 130 to generate a noise, thereby advantageously improving the functionality of the multi-layer pet toy 100.

Referring generally to FIGS. 1-4, the first panel 110 and the second panel 120 may each include a binding 140. The binding 140 may be coupled to each of the outer layer 150, the durable lining 160, and the inner layer 170 of the first panel 110 and the second panel 120, respectively. According to some examples of the present disclosure, the binding 140 may be disposed along and coupled to a periphery of the outer layer 150, durable lining 160, and inner layer 170 included in a panel (e.g., first panel 110, second panel 120). In some examples, the binding 140 may be directly coupled to each of the outer layer 150, the durable lining 160, and the inner layer 170. For example, the binding 140 may be sewn to the outer layer 150, the durable lining 160, and the inner layer 170 included in a panel. In other words, once the outer layer 150, the durable lining 160, and the inner layer 170 are coupled together as described above, the binding 140 may be applied to the periphery of the joined three layers (see FIG. 4) and sewn to the joined three layers. The binding 140 may advantageously strengthen a connection between the outer layer 150, the durable lining 160, and the inner layer 170 and/or maintain a position of the outer layer 150, the durable lining 160, and the inner layer 170 relative to one another. According to some examples of the present disclosure, a single binding 140 may be coupled to the outer layer 150, the durable lining 160, and the inner layer 170 included in each of the first panel 110 and the second panel 120. Specifically, in some examples, a single binding 140 may be wrapped around and sewn to the outer layer 150, durable lining 160, and inner layer 170 included in each of the first panel 110 and the second panel 120, such that the single binding 140 is sewn or stitched through all six layers (e.g., two outer layers 150, two durable linings 160, and two inner layers 170).

Referring to FIG. 5, a squeaker 180 is illustrated in accordance with one example of the present disclosure. In some examples of the present disclosure, the squeaker 180 may be the noisemaker 130 described above with respect to FIGS. 1-4. As shown in FIG. 5, the squeaker 180 may include a bladder 181 and a whistle 182. The bladder 181 may be configured to elastically deform and to hold a volume of air. As shown in FIG. 5, the bladder 181 may have a cylindrical shape. The whistle 182 may fluidly couple an interior of the bladder 181 to an exterior of the squeaker 180 such that air traveling into or out of the bladder 181 must travel through the whistle 182. The whistle 182 may include a vibrating component (e.g., reed) configured to produce or generate a noise as air flows through the whistle 182 (e.g., to or from the bladder 181). Accordingly, as air travels through the whistle 182 into and/or out of the bladder 181 the vibrating component may vibrate, generating a noise. Accordingly, as a pet plays with a multi-layer pet toy 100 including a squeaker 180 disposed between two or more panels (e.g., a first panel 110 and second panel 120) the bladder 181 may be deformed (e.g., squeezed, compressed) and released, causing air to flow in and out of the bladder 181 and thus causing the whistle 182 to generate a noise.

Referring to FIG. 6, a squeaker 190 is illustrated in accordance with another example of the present disclosure. In some examples, the squeaker 190 may be the noisemaker 130 described above with respect to FIGS. 1-4. The squeaker 190 may be the same or substantially similar to the squeaker 180 of FIG. 5, except the bladder 191 of the squeaker 190 may have a circular shape. The whistle 192 may be the same as the whistle 182 of FIG. 5. The squeakers 180, 190 may each be configured for use in multi-layer pet toys 100 having different shapes.

Figure 7:
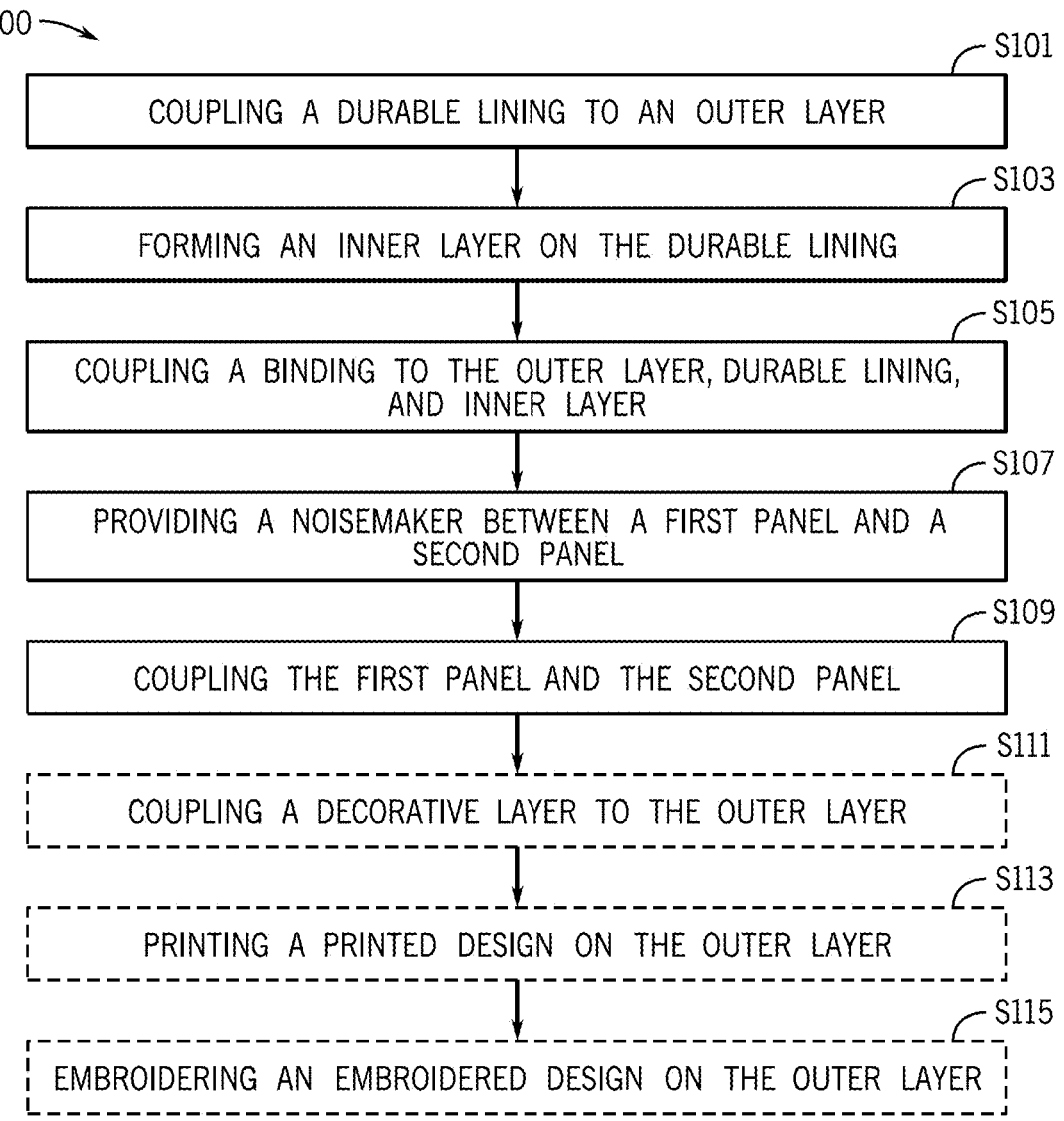
FIG. 7 illustrates a flowchart for manufacturing a multi-layered pet toy in accordance with one example of the present disclosure.

Referring to FIG. 7, a flowchart 200 for manufacturing a multi-layer pet toy is illustrated in accordance with one example of the present disclosure. The flowchart 200 may be used to manufacture the multi-layer pet toy 100 described above with respect to FIGS. 1-4. Additional, different, or fewer acts may be provided. The flow chart 200 may be implemented in the order shown but may also be implemented in or according to any number of different orders.

According to some examples of the present disclosure, one or more panels (e.g., first panel 110, second panel 120) may be assembled before being coupled to one another to form the multi-layer pet toy 100 described above with respect to FIGS. 1-4.

In a first act S101, a durable lining 160 may be coupled to an outer layer 150. In some examples, the durable lining 160 may be coupled to the outer layer 150 using a glue or an adhesive. For example, a glue or adhesive may be applied to one or both of the durable lining 160 and the outer layer 150 and the durable lining 160 and outer layer 150 may be pressed together, coupling the durable lining 160 to the outer layer 150. In some examples, the durable lining 160 may be coupled to the outer layer 150 using a thermal bonding process, in which an adhesive is applied to one or both of the durable lining 160 and the outer layer 150 and the durable lining 160 and outer layer 150 are pressed together while at an elevated temperature setting the adhesive. In yet other examples, the durable lining 160 may be sewn to the outer layer 150. For example, a periphery and/or interior portion of the durable lining 160 may be sewn to a periphery and/or interior portion of the outer layer 150, respectively. In some examples, a glue or adhesive and sewing may be used to couple the durable lining 160 to the outer layer 150. As described above, according to some examples, the durable lining may be comprised of a heat resistant material, such as nylon, such that the inner layer may be directly formed on the durable lining using a plastic molding process requiring an elevated temperature or a thermal joining or bonding process. According to some examples, the outer layer may have a relatively low melting point such that it is not possible to directly form the inner layer on the outer layer using a plastic molding process or a thermal joining or bonding process. Accordingly, in these examples, a durable lining may first be coupled to the outer layer, such that the inner layer may be directly formed on the durable lining using a plastic molding process requiring an elevated temperature or a thermal joining or bonding process.

In a second act S103, in accordance with some examples of the present disclosure, an inner layer 170 may be formed on the durable lining 160 (i.e., on the durable lining 160/outer layer 150 combo formed in act S101). Specifically, the inner layer 170 may be formed directly on the durable lining 160. For example, the inner layer 170 may be comprised of a plastic (e.g., thermoplastic) material and may be molded directly to the durable lining 160 using one or more plastic molding processes. For example, the inner layer 170 may be injection molded, compression molded, or gravity cast directly on to the durable lining 160 of the durable lining 160/outer layer 150 combo formed in act S101. The inner layer 170 may be formed on the durable lining 160 so as to have a shape corresponding to the shape of the durable lining 160. For example, the inner layer 170 may be formed on the durable lining 160 so as to have a shape corresponding to the silhouette of an object or animal represented by the pet toy 100.

According to some examples of the present disclosure, after the durable lining 160 and the outer layer 150 have been coupled to one another (act S101), the durable lining 160 and attached outer layer 150 may be placed into a mold and the inner layer 170 may be molded (e.g., formed) directly on the durable lining 160. Specifically, in some examples, a mold may be comprised of a first half and a second half, which when placed adjacent to one another form a sealed, enclosed space having the desired shape of the combined outer layer 150, durable lining 160, and inner layer 170. According to some examples of the present disclosure, the mold may be opened (e.g., the mold first half and the mold second half may be separated) and the combined outer layer 150 and durable lining 160 may be placed in one of the first mold half or the second mold half. Specifically, the combined outer layer 150 and durable lining 160 may be placed in the first mold half or the second mold half, such that the outer layer 150 abuts a wall of the mold and the durable lining 160 faces the interior of the mold space (i.e., such that the inner layer 170 may be formed on the durable lining 160). After the combined outer layer 150 and durable lining 160 are placed in the mold, the mold may be closed (e.g., the mold first half and the mold second half may be brought together), forming the sealed, enclosed space in which the inner layer 170 may be formed onto the durable lining 160.

In some examples, the inner layer 170 may be injection molded; specifically, a plastic (e.g., a thermoplastic elastomer (TPE), such as thermoplastic rubber (TPR)) may be injected into the mold through an injection channel while at an elevated temperature and/or in a liquid phase. The injection channel may be fluidly connected to the mold first half and/or the mold second half such that the interior of the mold is filled with a thermoplastic elastomer (TPE). The TPE may be injected into the mold at an elevated temperature. The TPE may be injected into the mold under pressure such that the entire mold is filled. The TPE injected into the mold may fill the mold space abutting the durable lining 160 and subsequently cool, forming the inner layer 170 on the durable lining 160.

In accordance with other examples of the present disclosure, a mold may be placed adjacent to a surface of the durable lining 160 on which the inner layer 170 is formed. Specifically, the mold may be pressed against the durable lining 160, which is supported by a rigid surface as opposed to a second mold half, such that the mold and the durable lining 160 collectively form a sealed, enclosed space having the desired shape of the inner layer 170. A thermoplastic elastomer (TPE) of which the inner layer 170 is made may then be provided to an interior of the mold, for example, under elevated temperature and/or pressure such that an interior of the mold is filled. The TPE may subsequently cool, forming the inner layer 170 directly on the surface of the durable lining 160.

In accordance with some examples of the present disclosure, the inner layer 170 may be formed separately from and subsequently coupled to the durable lining 160. In these examples, in the second act S103, the inner layer 170 may not be formed on the durable lining 160, but instead, may be coupled to the durable lining 160.

In some examples, the inner layer 170 may be coupled to the durable lining 160 using a glue or an adhesive. For example, a glue or adhesive may be applied to one or both of the inner layer 170 and the durable lining 160 and the inner layer 170 and durable lining 160 may be pressed together, coupling the inner layer 170 to the durable lining 160. In some examples, the inner layer 170 may be coupled to the durable lining 160 using a thermal bonding process, in which an adhesive is applied to one or both of the inner layer 170 and the durable lining 160 and the inner layer 170 and durable lining 160 are pressed together while at an elevated temperature setting the adhesive. In yet other examples, the inner layer 170 may be sewn to the durable lining 160. For example, a periphery and/or interior portion of the inner layer 170 may be sewn to a periphery and/or interior portion of the durable lining 160, respectively. In some examples, a glue or adhesive and sewing may be used to couple the inner layer 170 to the durable lining 160.

In some examples, the inner layer 170 may be coupled to the durable lining 160 using one or more plastic welding processes. For example, the inner layer 170 may be coupled to the durable lining 160 using one or more of hot plate welding, ultrasonic welding, friction welding, hot gas welding, extrusion welding, laser welding, and the like. According to some examples of the present disclosure, the inner layer 170 may be coupled to the durable lining 160 using any combination of an adhesive, sewing, or plastic welding.

In a third act S105, a binding 140 may be coupled to the outer layer 150, the durable lining 160, and the inner layer 170 formed by the previous acts S101 and S103. Specifically, in some examples, the binding 140 may be directly coupled to each of the outer layer 150, the durable lining 160, and the inner layer 170. According to some examples, directly coupling a binding 140 to the outer layer 150, the durable lining 160, and the inner layer 170, respectively, of the first panel 110 and the second panel 120 may increase the strength and durability of the pet toy 100. In some examples, the binding 140 may be disposed along a periphery of the outer layer 150, the durable lining 160, and the inner layer 170. According to some examples of the present disclosure, the binding 140 may be sewn to the outer layer 150, the durable lining 160, and the inner layer 170. Specifically, the binding 140 may be folded along a periphery of the outer layer 150, the durable lining 160, and the inner layer 170 such that the binding 140 abuts or contacts a face of the outer layer 150 and a face of the inner layer 170, as shown in FIG. 4. The binding 140, folded along a periphery of the outer layer 150, the durable lining 160, and the inner layer 170 may then be sewn to the outer layer 150, the durable lining 160, and the inner layer 170. In some examples, the binding 140 may be sewn to the outer layer 150, durable lining 160, and inner layer 170 using regular and zig-zag stitching. In some examples, after the binding 140 has been sewn to the outer layer 150, the durable lining 160, and the inner layer 170, assembly of a panel (e.g., first panel 110, second panel 120) may be complete. In other words, a panel is formed by acts S101-S105. The flowchart 200 may include further acts for manufacturing a multi-layer pet toy 100 using two or more panels (e.g., first panel 110, second panel 120) and a noisemaker 130. For example, acts S101-S105 may be repeated to form any number of panels needed to manufacture a desired pet toy 100. In the example shown in the flowchart 200 of FIG. 7, two panels are formed by acts S101-S105.

In a fourth act S107, a noisemaker 130 may be provided between two or more panels (e.g., first panel 110, second panel 120) formed by previous acts S101-S105. Specifically, according to some examples of the present disclosure, the noisemaker 130 may be provided between two or more panels before the two or more panels are coupled to one another. The noisemaker 130 may be provided between the two or more panels so as to contact and/or be directly adjacent to an inner layer 170 of each of the each of the two or more panels (e.g., first panel 110, second panel 120). According to some examples of the present disclosure, the two or more panels (e.g., first panel 110, second panel 120) may be subsequently coupled to one another in act S109 such that the noisemaker 130 is maintained (e.g., sealed, locked) between the two or more panels. In some examples, two or more noisemakers 130 may be provided between the two or more panels.

As noted above, the noisemaker 130 may be any device configured to produce or generate a noise when moved or manipulated (e.g., shake, compressed, deformed, etc.). In accordance with some examples of the present disclosure, the noisemaker 130 may be one of a squeaker, a bell, crinkle paper, a rattle, a clicker, and the like, or any combination thereof. In some examples, the noisemaker 130 may be one of the squeakers 180, 190 described herein.

In a fifth act S109, the two or more panels with the noisemaker 130 therebetween may be coupled to one another. According to the present disclosure, one or more noisemakers 130 may be disposed between the two or more panels, such that the noisemaker(s) 130 are retained between the two or more panels when the two or more panels are coupled to one another. Specifically, in accordance with some examples of the present disclosure, the first panel 110 and the second panel 120 may be coupled to one another. One or more noisemakers 130 may be provided or disposed between the first panel 110 and the second panel 120, such that the noisemaker 130 is retained between the first panel 110 and the second panel 120 when the first panel 110 and the second panel 120 are coupled to one another. Specifically, according to some examples of the present disclosure, a periphery of the first panel 110 may be coupled to a periphery of the second panel 120 such that the noisemaker 130 is disposed in a cavity or pocket between the first panel 110 and the second panel 120.

The first panel 110 and the second panel 120 may be directly coupled to one another. According to some examples of the present disclosure, a binding 140 of the first panel 110 may be coupled (e.g., directly coupled) to a binding 140 of the second panel 120. In some examples, the first panel 110 and the second panel 120 may be sewn together. Specifically, a periphery of the first panel 110 may be sewn to a periphery of the second panel 120. In some examples, a binding 140 of the first panel 110 may be sewn to a binding 140 of the second panel 120. The first panel 110 and the second panel 120 may be sewn to one another such that stitching 141 (as shown in FIGS. 1 and 2) extends along the binding 140 and/or periphery of the first panel 110 and the second panel 120. In some examples, as shown in FIGS. 1 and 2, the first panel 110 and the second panel 120 may be sewn to one another using zig-zag stitching 141; however, the present disclosure is not limited thereto and any stitching pattern may be used to couple the first panel 110 and the second panel 120. For example, a running stitch, catch stitch, and the like may be used to couple the bindings 140 of the first panel 110 and the second panel 120.

In other examples, the binding 140 and/or the periphery of the first panel 110 and the second panel 120, respectively, may be coupled to one another using a glue or adhesive. For example, a glue or adhesive may be applied to the binding 140 and/or periphery of the first panel 110 and/or the second panel 120, respectively and the first panel 110 and second panel 120 (e.g., the binding 140 and/or periphery of the first panel 110 and the second panel 120, respectively) may be pressed together, coupling the first panel 110 and the second panel 120 to one another. In some examples, the first panel 110 and the second panel 120 may be coupled using a thermal bonding process, in which a glue or adhesive requiring an elevated temperature to set is applied to one or both of the first panel 110 and the second panel 120 (e.g., a periphery and/or binding 140 of the first panel 110 and the second panel 120, respectively) and the first panel 110 and the second panel 120 may be pressed together while at an elevated temperature, coupling the first panel 110 and the second panel 120. In some examples, the first panel 110 and the second panel 120 may be coupled together using both a glue or adhesive and sewing.

Sewing or otherwise coupling a binding 140 on both the first panel 110 and second panel 120 individually, and then sewing or otherwise coupling the two bindings 140 of respective panels 110, 120 together provides a very robust, heavy duty, durable and tough construction, thereby preventing the two panels 110, 120 from becoming separated after repeated use by pets, which is an improvement in the design of multi-layered pet toys.

However, in another embodiment, a single binding 140 may be coupled to the outer layer 150, durable lining 160, and inner layer 170 included in the first panel 110 and the second panel 120. In other words, rather than respective bindings 140 of respective panels 110, 120 being sewn or glued together, a single binding is used to couple all six layers together (e.g., two outer layers 150, two durable linings 160, and two inner layers 170). According to some examples, coupling all six layers together using a single binding may improve manufacturability and reduce costs of the pet toy by reducing the number of components included in and/or a number of operations required to manufacture the pet toy 100. Accordingly, in some examples, the fourth act S107 of providing a noisemaker 130 between the panels (e.g., 110, 120) may be performed before the third act S105 of coupling a binding 140 to the layers 150, 160, 170. In this case, the third act S105 and the fifth act S109 may be combined into a single act, since the single binding 140 not only couples a binding 140 to the outer layer 150, durable lining 160, and inner layer 170 (e.g., act S105), but also couples the first panel 110 to the second panel 120 (e.g., act S109).

In accordance with some examples of the present disclosure, in a sixth act S111, which is optional, one or more decorative layers 111 may be coupled to the outer layer 150. For example, one or more decorative layers may be coupled to an exterior side of the outer panel (e.g., opposite the durable lining 160), such that the one or more decorative layers 111 form a portion of the exterior of the outer layer 150. Thus, the one or more decorative layers 111 may form a portion of the exterior of the pet toy 100. According to some examples, the one or more decorative layers 111 may be coupled to the outer layer 150 before the durable lining 160 is coupled to the outer layer 160. According to other examples, the one or more decorative layers 111 may be coupled to the outer layer 150 after the durable lining 160 is coupled to the outer layer 150. For example, the one or more decorative layers 111 may be coupled to the outer layer 150 after the inner layer 170 has been formed on the durable lining 160 and/or after the binding 140 has been coupled to the outer layer 150, the durable lining 160, and the inner layer 170. The one or more decorative layers 111 may be sewn, glued, or otherwise coupled to the outer layer 150.

In accordance with some examples of the present disclosure, in a seventh act S113, which is optional, one or more printed designs 112 may be printed on the outer layer 150. Specifically, one or more dyes of inks may be used to print a printed design 112 on the outer layer 150 of the first panel 110 and/or the second panel 120. In some examples, a printed design 112 may be printed on the outer layer 150 (e.g., of the first panel 110 and/or second panel 120) after the first panel 110 and the second panel 120 are coupled to one another. In other examples, a printed design 112 may be printed on the outer layer 150 (e.g., of the first panel 110 and/or second panel 120) before the first panel 110 and the second panel 120 are coupled to one another. In some examples, a printed design 112 may be printed on the outer layer (e.g., of the first panel 110 and/or second panel 120) before a durable lining 160 is coupled to the outer layer 150. According to the present disclosure, one or more printed designs 112 may be screen printed (e.g., rotary screen print), digitally printed (e.g., inkjet printed), and/or heat transfer printed on the outer layer 150.

In accordance with some examples of the present disclosure, in an eighth act S115, also optional, one or more embroidered designs 113 may be embroidered on the outer layer 150 of the first panel 110 and/or the second panel 120. According to various examples of the present disclosure, one or more embroidered designs 113 may be embroidered on the outer layer 150 (e.g., of the first panel 110 and/or second panel 120) after the first panel 110 and the second panel 120 are coupled, before the first panel 110 and second panel 120 are coupled, and/or before the durable lining 160 is coupled to the outer layer 150.

Figure 8:
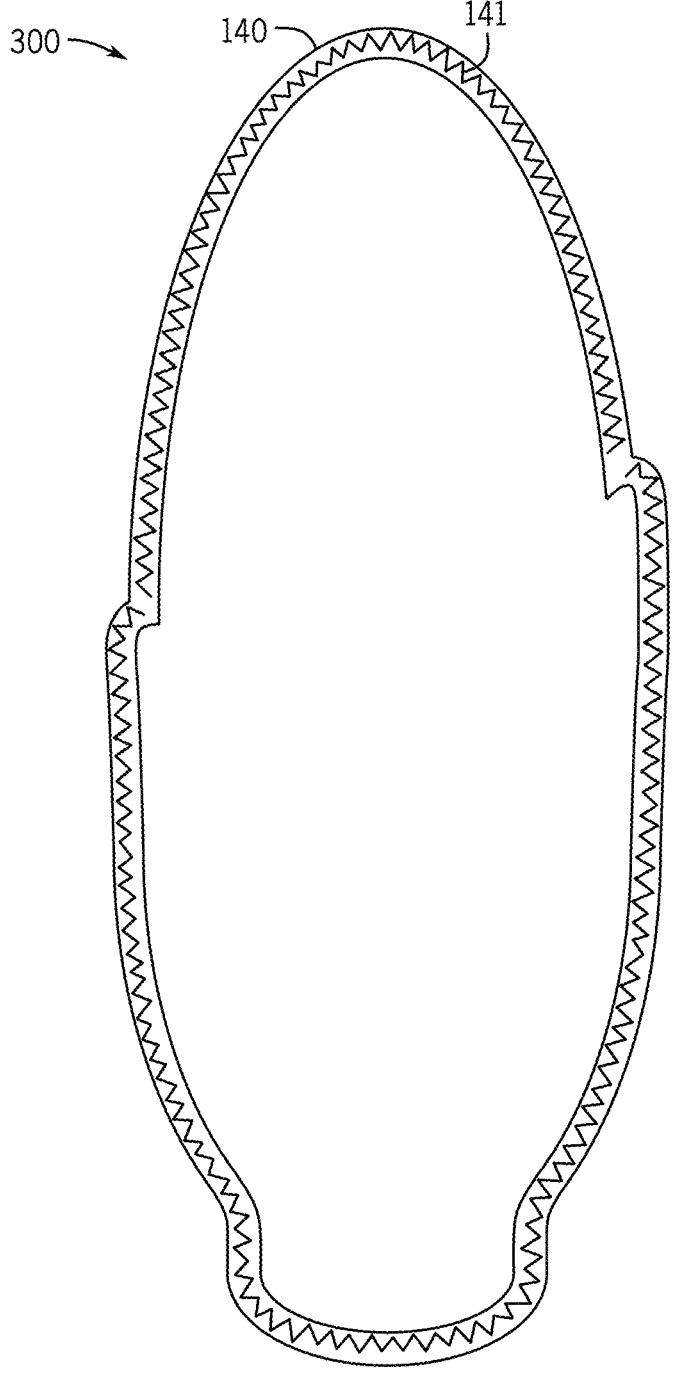
FIG. 8 illustrates a front view of a multi-layered pet toy in accordance with another example of the present disclosure.
Figure 9:
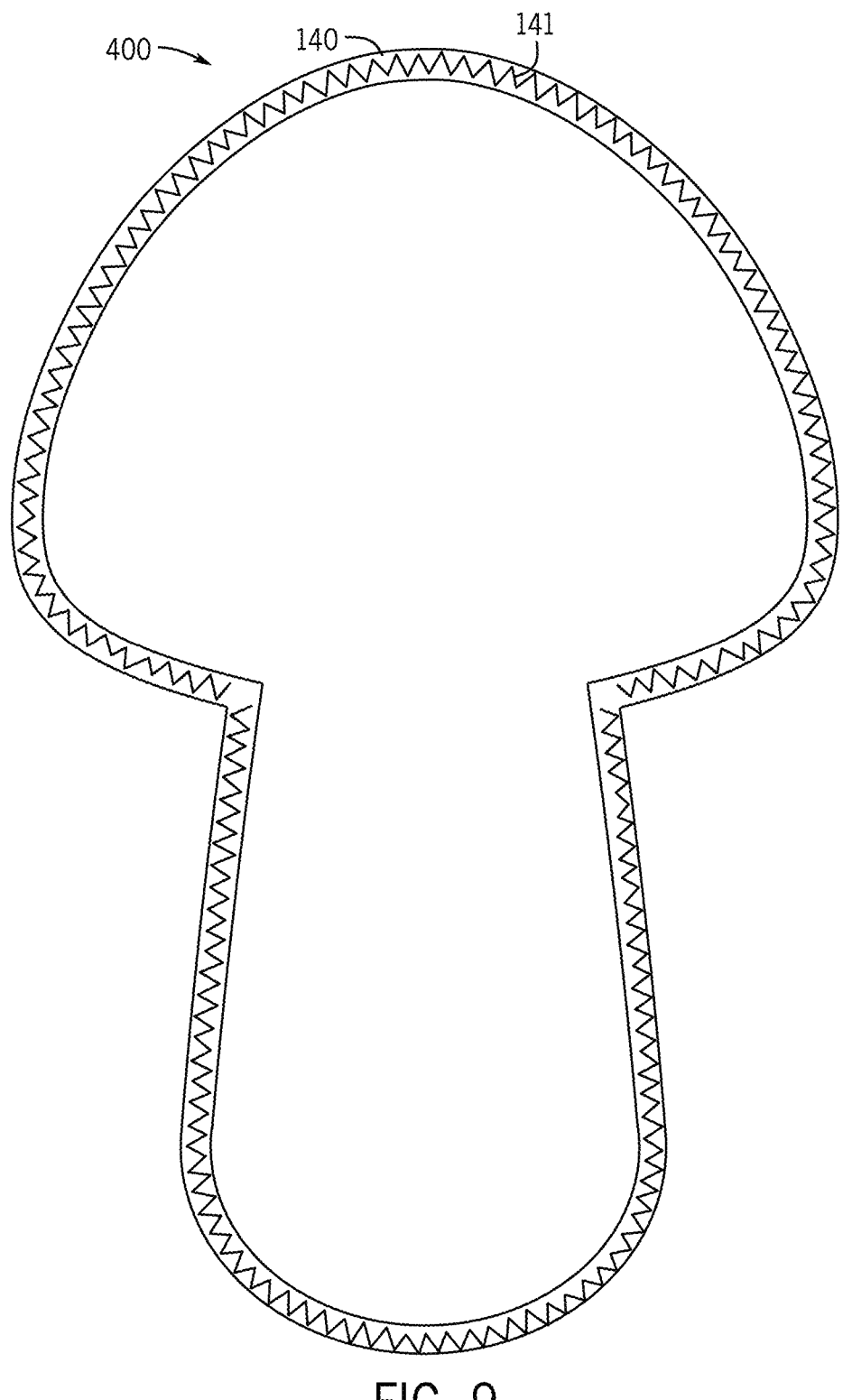
FIG. 9 illustrates a front view of a multi-layered pet toy in accordance with yet another example of the present disclosure.
Figure 10:
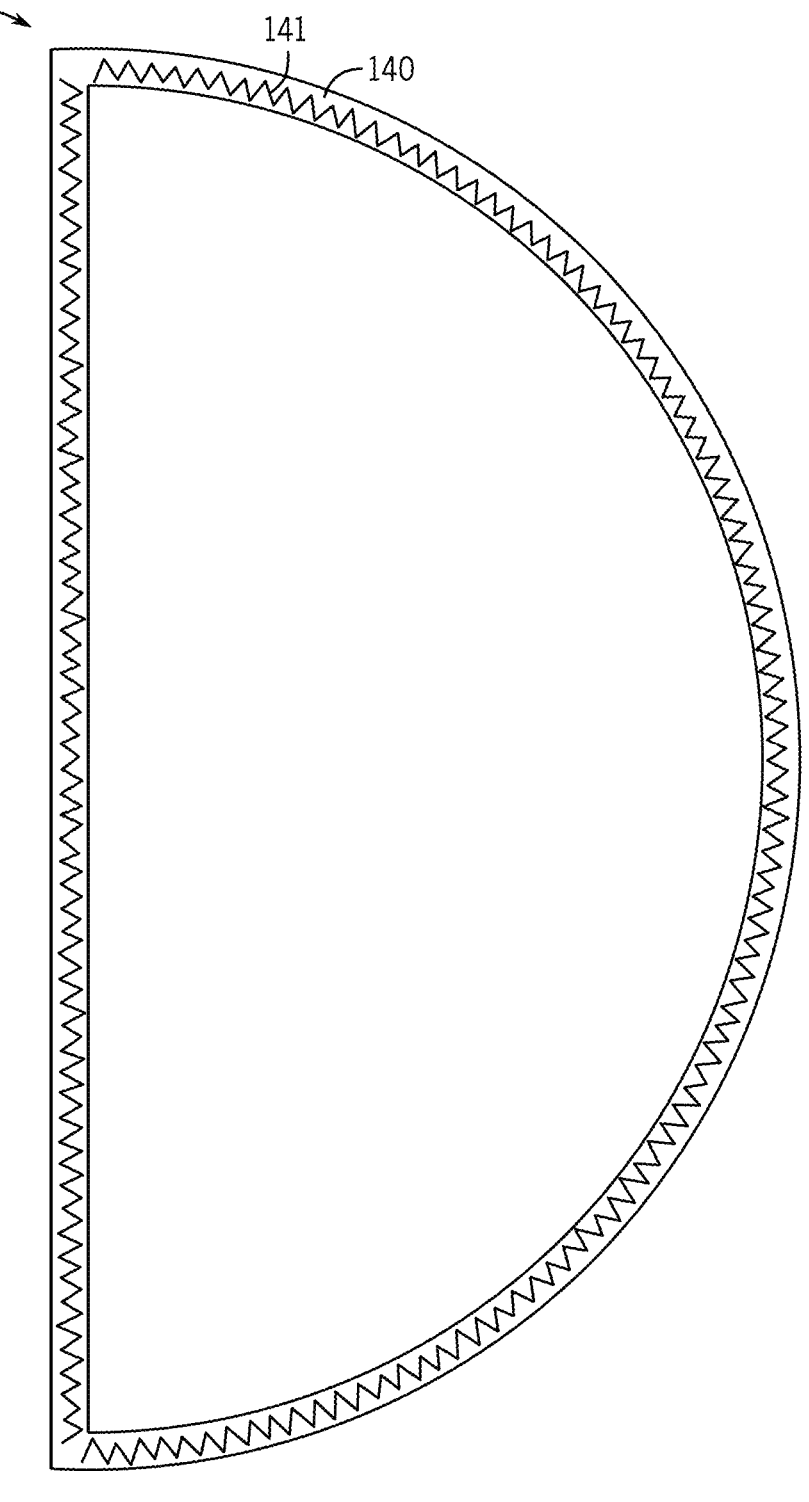
FIG. 10 illustrates a front view of another pet toy in accordance with still another example of the present disclosure.

FIGS. 8-10 illustrate alternative designs of the disclosed multi-layer pet toy 100. Referring to FIG. 8, a multi-layer pet toy 300 is illustrated in accordance with another example of the present disclosure. The multi-layer pet toy 300 may be the same or substantially similar to the multi-layer pet toy 100 described above with respect to FIGS. 1-4. For example, the multi-layer pet toy 300 may include first and second panels (e.g., 110, 120, respectively) each including an outer layer, a durable lining, an inner layer, and a binding. Further, the first and second panels may be coupled to one another with a noisemaker (e.g., 130) disposed therebetween. However, as illustrated in FIG. 8, the multi-layer pet toy 300, specifically, the first and second panels of the multi-layer pet toy 300, may have the shape of a cob of corn. In some examples, the multi-layer pet toy 300 may include the squeaker 180 described above with respect to FIG. 5.

Referring to FIG. 9, a multi-layer pet toy 400 is illustrated in accordance with another example of the present disclosure. The multi-layer pet toy 400 may be the same or substantially similar to the multi-layer pet toy 100 described above with respect to FIGS. 1-4. For example, the multi-layer pet toy 400 may include first and second panels (e.g., 110, 120, respectively) each including an outer layer, a durable lining, an inner layer, and a binding. Further, the first and second panels may be coupled to one another with a noisemaker (e.g., 130) disposed therebetween. However, as illustrated in FIG. 9, the multi-layer pet toy 400, specifically, the first and second panels of the multi-layer pet toy 400, may have the shape of a mushroom. In some examples, the multi-layer pet toy 400 may include the squeaker 180 described above with respect to FIG. 5.

Referring to FIG. 10, a multi-layer pet toy 500 is illustrated in accordance with another example of the present disclosure. The multi-layer pet toy 500 may be the same or substantially similar to the multi-layer pet toy 100 described above with respect to FIGS. 1-4. For example, the multi-layer pet toy 500 may include first and second panels (e.g., 110, 120, respectively) each including an outer layer, a durable lining, an inner layer, and a binding. Further, the first and second panels may be coupled to one another with a noisemaker (e.g., 130) disposed therebetween. However, as illustrated in FIG. 10, the multi-layer pet toy 500, specifically, the first and second panels of the multi-layer pet toy 500, may have the shape of a slice of watermelon. In some examples, the multi-layer pet toy 500 may include the squeaker 180 described above with respect to FIG. 5.

Each of the examples shown in FIGS. 8-9 may also include one or more printed designs 112 and/or one or more embroidered designs 113 either printed or embroidered on an outer layer of the first panel and/or the second panel. For example, the printed designs 112 and/or embroidered designs 113 may be of eyebrows, eyes, eyelashes, a nose, a mouth, or the like, or any other feature or features of an object or animal to which the shape of the pet toy corresponds (e.g., avocado seed/pit, mushroom spots, watermelon seeds, etc.).

While the present disclosure has been described with reference to specific examples, which are intended to be illustrative only and not to be limiting of the disclosure, it should be apparent to those of ordinary skill in the art that changes, additions and/or deletions may be made to the disclosed embodiments without departing from the spirit and scope of the disclosure.

The foregoing description is given for clarity of understanding only, and no unnecessary limitations should be understood therefrom, as modifications within the scope of the disclosure may be apparent to those having ordinary skill in the art.

When a component, device, element, or the like of the present disclosure is described as having a purpose or performing an operation, function, or the like, the component, device, or element, should be considered herein as being "configured to" meet that purpose or perform that operation or function.

What is claimed is:

1. A method of manufacturing a multi-layered pet toy, the method comprising:
   assembling a first panel and a second panel by:
      coupling a durable lining to an outer layer, the outer layer configured to define an exterior surface of the pet toy;
      coupling an inner layer to the durable lining;
      folding a binding along an outer periphery of the outer layer, the durable lining, and the inner layer for each of the first panel and the second panel;
      coupling the folded binding to the outer layer, the durable lining, and the inner layer such that the folded binding is disposed along the outer periphery of the outer layer, the durable lining, and the inner layer for each of the first panel and the second panel; and
   coupling the first panel and the second panel.

2. The method of claim 1, further comprising:
   providing a noisemaker between the first panel and the second panel, before coupling the first panel and the second panel.

3. The method of claim 2, wherein the noisemaker includes a bladder and a whistle.

4. The method of claim 1, wherein the inner layer is injection molded onto the durable lining.

5. The method of claim 1, wherein coupling the first panel and the second panel comprises sewing the binding of the first panel and the binding of the second panel together.

6. The method of claim 1, further comprising:
   coupling a decorative layer to the outer layer.

7. The method of claim 1, wherein the outer layer, the durable lining, and the inner layer have a corresponding shape.

8. The method of claim 1, wherein coupling the inner layer to the durable lining comprises forming the inner layer directly on the durable lining.

9. The method of claim 1, further comprising:
   printing an image on the outer layer of the first panel or the outer layer of the second panel.

10. The method of claim 1, wherein coupling the folded binding to the outer layer, the durable lining, and the inner layer comprises sewing the folded binding to the outer layer, the durable lining, and the inner layer.

* * * * *